US008451782B2

(12) United States Patent
Denteneer et al.

(10) Patent No.: US 8,451,782 B2
(45) Date of Patent: May 28, 2013

(54) WIRELESS NETWORK WITH CONTENTION AND CONTENTION-FREE PERIODS

(75) Inventors: Theodorus Jacobus Johannes Denteneer, Eindhoven (NL); Guido Roland Hiertz, Aachen (DE); Gustaf Sebastian Max, Cologne (DE); Bernard Walke, Wuerselen (DE); Xiangyu Wang, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 897 days.

(21) Appl. No.: 12/440,602

(22) PCT Filed: Sep. 11, 2007

(86) PCT No.: PCT/IB2007/053659
§ 371 (c)(1),
(2), (4) Date: Mar. 10, 2009

(87) PCT Pub. No.: WO2008/032267
PCT Pub. Date: Mar. 20, 2008

(65) Prior Publication Data
US 2010/0014472 A1   Jan. 21, 2010

(30) Foreign Application Priority Data
Sep. 15, 2006   (EP) ..................................... 06120763

(51) Int. Cl.
*H04W 4/00*   (2009.01)

(52) U.S. Cl.
USPC ........................................... 370/329; 370/445

(58) Field of Classification Search
USPC .................................................... 370/329, 445
See application file for complete search history.

(56) References Cited

U.S. PATENT DOCUMENTS

| | | | | |
|---|---|---|---|---|
| 2006/0045048 A1* | 3/2006 | Kwon et al. | | 370/329 |
| 2007/0230499 A1* | 10/2007 | Iwamura | | 370/445 |
| 2009/0279487 A1* | 11/2009 | Reumerman et al. | | 370/329 |

FOREIGN PATENT DOCUMENTS

| | | | |
|---|---|---|---|
| WO | WO 2005/094103 | * | 10/2005 |
| WO | WO2005094103 A1 | | 10/2005 |
| WO | WO2006020520 A2 | | 2/2006 |

\* cited by examiner

*Primary Examiner* — Sai-Ming Chan
(74) *Attorney, Agent, or Firm* — Larry Liberchuk

(57) ABSTRACT

A wireless network (1) comprises mesh devices and non-mesh devices. A medium access control architecture incorporates at least a point coordination function as an access method, wherein the point coordination function starts a contention-free period (30) with a beacon (32) so that a non-polled transmission by the non-mesh devices is prevented. Further, the mesh devices are enable to communicate during the contention-free period (30). Hence, communication between the mesh devices is priorisized so that a high reliability is achieved and utilization of the wireless network (1) is optimized.

15 Claims, 3 Drawing Sheets

WIRELESS NETWORK WITH CONTENTION AND CONTENTION-FREE PERIODS

FIELD OF THE INVENTION

The present invention relates to a wireless network comprising a medium access control architecture and to a method for such an wireless network. More particularly, the present invention relates to a wireless network on the basis of a standard such as a standard from the family of IEEE 802 standards, especially ANSI/IEEE Std 802.11.

BACKGROUND OF THE INVENTION

In a wireless network the wireless medium is shared among several devices. With cheap devices only a single radio is available. Further, in dense populated areas, only a single frequency channel may be available. A wireless mesh network may help to extend the range of a wireless network and provide seamless coverage. In case of a single frequency channel, stations and entities of the wireless mesh network share the same channel of the wireless medium. However, the wireless mesh network carries the aggregated traffic of all stations. This may result in a poor performance or a reduced reliability of a network.

SUMMARY OF THE INVENTION

It is an object of the invention to provide a wireless network, and a method and device for such a wireless network with an improved performance, especially with an improved reliability.

This object is solved by a wireless network as defined in claim 1, by a method as defined in claim 7, and by a mesh device as defined in claim 11. Advantageous developments of the invention are mentioned in the dependent claims.

The point coordination function controls frame transfers during a contention-free period. The contention-free period usually alternates with a contention period. Due to the fact that the mesh devices are enabled to communicate during the contention-free period, priorization of the mesh network between the mesh devices is achieved.

It is advantageous that the beacon starting a contention-free period is repeated. Non-mesh devices are not allowed to transmit during the repeated intervals, so that in these periods, the wireless medium is shared among the mesh devices only. Other non-mesh devices remain silent.

It is advantageous that the mesh devices are enabled to communicate during a mesh contention-free period that is a part of the contention-free period. This has the advantage that the communication between the mesh devices can be limited to a part of the contention-free period. Thereby, it is advantageous that the duration of the mesh contention-free period is dynamically adapted according to an actual amount of data to be exchanged between the mesh devices. This has the advantage that the performance of the network can be further increased.

It is advantageous that the mesh contention-free period follows the beacon. This has the advantage that the mesh devices, if necessary, can access the wireless medium immediately after reception of the beacon.

It is advantageous that the beacon comprises a mesh contention-free period announcement flag indicating to the mesh devices whether they can ignore the announced, upcoming contention-free period, and that the mesh devices are enabled to communicate on the basis of an actual setting of the mesh contention-free period announcement flag. This has the advantage that, if necessary, the mesh devices are only enabled to a polled transmission. The contention-free transfer protocol based on a polling scheme then applies both to the mesh devices and non-mesh devices. This can improve the reliability and/or the usability of the wireless network in some situations. Thereby, the mesh contention-free period announcement flag may also be set with reference to one or more specific mesh devices to enable communication between a specific part of the mesh devices during a contention-free period or a mesh contention-free period.

It is advantageous that the network comprises basic service sets and a distribution system, that each of the basic service sets comprises an access point, which is a mesh device, as well as stations that are not access points, that data is moved between each of the basic service sets and the distribution system via the access point belonging to this basic service set, and that the stations that are not access points are operating as non-mesh devices. This has the advantage that the access points may built up a mesh network, which is the distribution system, and that the access points, which may also be stations, gain priority over non-mesh devices at least during the contention-free period or the mesh contention-free period. Such a mesh network may be a wireless local area network or another mesh network in which the access points access at least a wireless channel during the contention-free period.

It is advantageous that the devices comprise a network allocation vector. The network allocation vector of non-mesh devices can be set via the beacon transmitted by an access point. Then, the non-mesh devices that are associated to this access point, preset the respective network allocation vector at a time indicated by the access point. The beacons may be periodically announced so that non-mesh devices that miss a beacon may also set their respective network allocation vector. Hence, non-mesh devices do not attempt to access the channel during a period defined by the contention-free period or the mesh contention-free period.

Further, it is advantageous that a frame exchange between the mesh devices is arranged essentially in contention-free periods of repeated beacons. As the beacon will be repeated, neighboring mesh devices know in advance about a particular period during which no non-mesh devices will transmit. Thus, it is advantageous that they prefer these periods for uninterrupted frame exchange with their mesh device neighbors.

These and other aspects of the invention will be apparent from and elucidated with reference to the embodiments described hereinafter.

BRIEF DESCRIPTION OF THE DRAWINGS

The present invention will become readily understood from the following description of preferred embodiments thereof made with reference to the accompanying drawings, in which like parts are designated by like reference signs and in which.

DETAILED DESCRIPTION OF THE EMBODIMENTS

Figure 1:
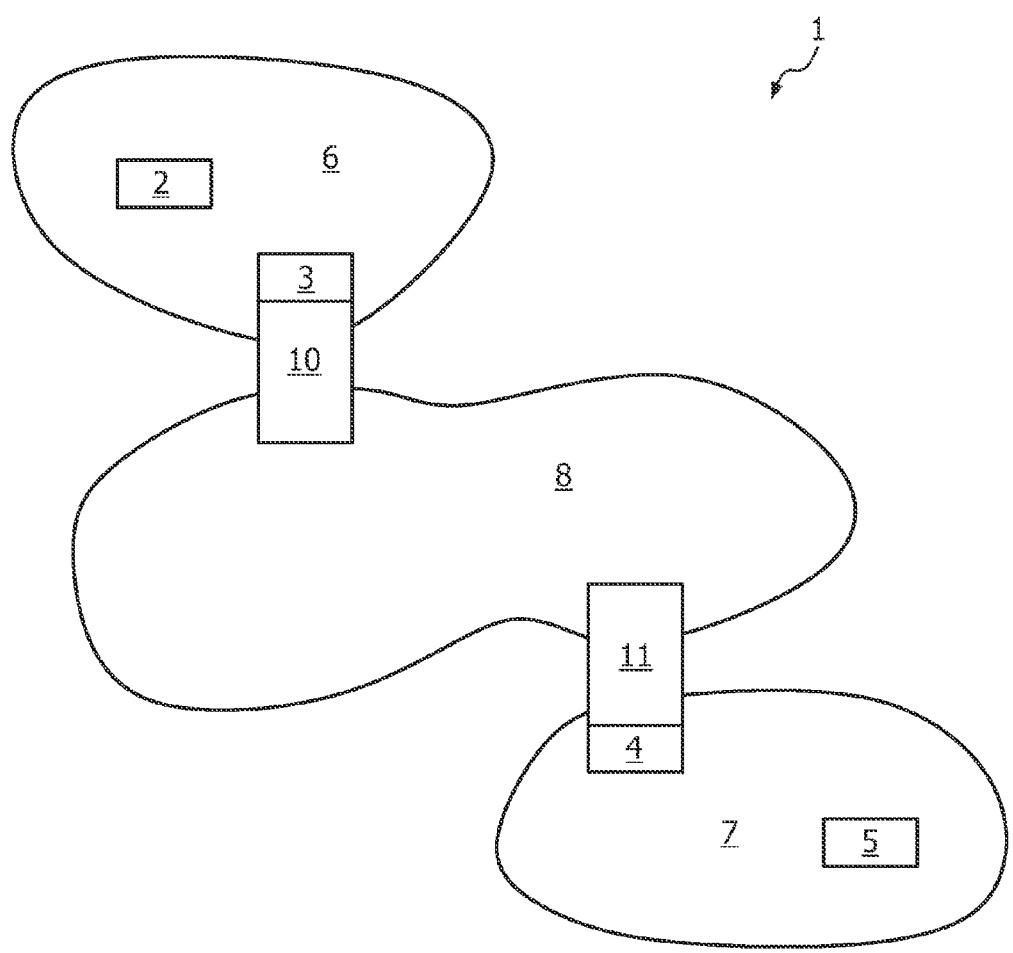
FIG. 1 shows a schematic view of a wireless network according to an embodiment of the present invention.

FIG. 1 shows a schematic structure of a wireless network 1 according to an embodiment of the invention. The wireless network 1 can be used for networks according to a standard such as ANSI/IEEE Std 802.11 and further developments such as IEEE 802.11s ESS. The wireless network 1 and the method for the wireless network 1 are applicable but not limited to wireless local area networks (WLAN). The wireless network 1 and the method for the wireless network 1 may be a part or built up a wireless communication system. Thereby, the wireless network 1 may also be combined with other networks, which can be wireless or wireline networks.

The addressable units of the wireless network 1 are stations 2, 3, 4, 5. Each of the stations 2 to 5 is a message destination, but not, generally, a fixed location. The stations 2 to 5 may be mobile or portable, wherein a portable one is moved from location to location, but is only used while at a fixed location, and a mobile one actually makes access to the wireless network 1 while in motion. But, propagation effects blur the distinction between portable and mobile stations 2 to 5 so that stationary stations often appear to be mobile due to propagation effects.

The architecture of the wireless network 1 comprises several components that interact to provide a wireless local area network or such, which supports station mobility to upper layers. The wireless network 1 comprises a basic service set 6, which comprises the stations 2, 3, and a basic service set 7, which comprises the stations 4, 5. The basic service sets 6, 7 are independent from each other. Each of the basic service sets 6, 7 may be formed without pre-planning, for only as long as the local area network is needed, so that this type of network may be seen as an ad-hoc network.

The association between the stations 2, 3 and basic service set 6 is dynamic. The stations 2, 3 may turn off or go out of range, other stations may turn on or come within range. The properties of the basic service set 7 are similar to that of the basic service set 6.

The wireless network 1 comprises a distribution system 8. The dynamic association between the stations 2 to 5 and their respective basic service sets 6, 7 is a reason to involve the distribution system 8 to allow communication between stations 2, 5 of different basic service sets 6, 7. Hence, the distribution system 8 connects different basic service sets 6, 7. Data move between the basic service set 6 and the distribution system 8 via an access point 10. Further, data move between the basic service set 7 and the distribution system 8 via an access point 11. Thereby, it is advantageous that each of the access points 10, 11 is a station (here station 3 and 4, respectively) that provides access to the distribution system 8 by providing a distribution system service in addition to acting as a station 3, 4. Therefore, each access point 10, 11 of the wireless network 1 is also a station 3, 4, but there are also stations 2, 5, which are not access points.

The combination of the distribution system 8 with a plurality of basic service sets 6, 7 allows to create a wireless network 1 of arbitrary size and complexity. Such a type of wireless network 1 may be referred to as an extended service set network 1, an example of which is shown in FIG. 2.

Figure 2:
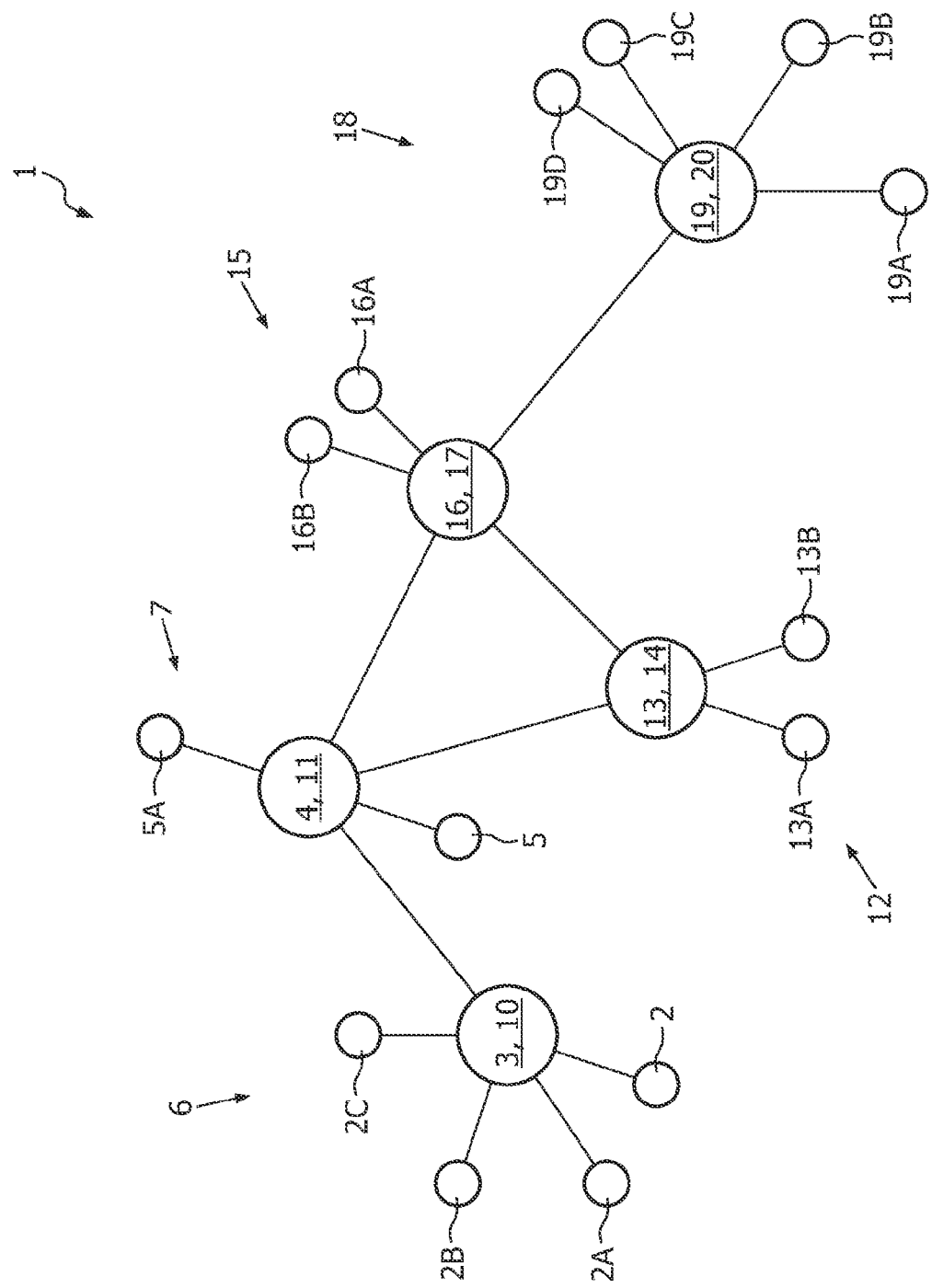
FIG. 2 illustrates links between stations of a wireless network according to an embodiment of the present invention.

FIG. 2 shows a schematic illustration of links between components of a wireless network 1 according to an embodiment of the present invention. In this embodiment the basic service set 6 comprises stations 2, 2A, 2B, 2C, 3. The basic service set 7 comprises stations 5, 5A. A further basic service set 12 comprises stations 13, 13A, 13B, wherein station 13 is also an access point 14 associated to the basic service set 12. A basic service set 15 comprises stations 16, 16A, 16B, wherein the station 16 is also an access point 17. And, a basic service set 18 comprises stations 19, 19A, 19B, 19C, 19D, wherein station 19 is also an access point 20. The access points 10, 11, 14, 17, 20 communicate with each other over the distribution system 8.

It is noted that the basic service sets 6, 7, 12, 15, 18 can partially overlap so that a contiguous coverage is achieved. Further, the basic service sets 6, 7, 12, 15, 18 may be physically disjointed. Also, at least two of the basic service sets 6, 7, 12, 15, 18 may be physically collocated to provide redundancy.

The wireless network 1 provides at least two categories of service: the station service and the distribution system service. The station service is the set of services that support transport of medium access control (MAC) service data units (MSDUs) between stations within a basic service set, for example, between the stations 2, 2A, 2B, 2C, 3 of the basic service set 6. Hence, for example, the stations 2, 2A, 2B, 2C, 3 of the basic service set 6 can directly communicate with each other.

The distribution system service is the set of services provided by the distribution system 8 that enables the medium access control to transport medium access control service data units between stations that are not in direct communication with each other over a single instance of a wireless medium. For example, consider a data message being sent from station 2 of the basic service set 6 to station 5 of the basic service set 7. The data message is sent from station 2 and received by station 3, which is an input access point 10. The access point 10 forwards the message to the distribution system service of the distribution system 8. The distribution system service of the distribution system 8 delivers the data message within the distribution system 8 such that it arrives at the station 4, which is the output access point 11 associated to the basic service set 7 comprising the station 5.

To deliver the data message within the distribution system 8, the distribution system service needs information about the appropriate access point 11 associated to the basic service set 7 of the station 5. Therefor, an association service is used, which associates each station 4, 5 of the basic service set 7 to the access point 11, wherein each of the stations 4, 5 can be associated to only one access point, that is, in this case, the access point 11.

A medium access control architecture is provided for the wireless network 1. The medium access control architecture incorporates a distributed coordination function and a point coordination function.

The distributed coordination function is a fundamental access method that may be a carrier sense multiple access with collision avoidance (CSMA/CA). The distributed coordination function is implemented in all stations 2 to 5A, 13 to 13B, 16 to 16B, 19 to 19D. For example, for station 2 to transmit, it first senses the medium to determine if another station 2A, 2B, 2C, 3 is transmitting. If the medium is not determined to be busy, the transmission proceeds. On the other hand, if the medium is determined to be busy, the station 2 defers until the end of the current transmission. After deferral, or prior to attempting to transmit again immediately after successful transmission, the station 2 may select a random backoff interval and decrements the backoff interval counter while that medium is idle.

The point coordination function uses a point coordinator, which operates at the access point 10, 11, 14, 17, or 20 of a basic service set 6, 7, 12, 15, 18, to determine which station 2 to 5A, 13 to 13B, 16 to 16B, 19 to 19D currently has the right to transmit. The operation is that of polling, with the point coordinator performing the role of the polling master. The operation of the point coordination function may, depending on the application, require additional coordination, to permit efficient operation in cases where multiple point-coordinated basic service sets 6, 7, 12, 15, 18 are operating on the same channel.

The point coordination function uses a virtual carrier-sense mechanism aided by an access priority mechanism and distributes information within beacon management frames to gain control of the medium by setting a network allocation vector in stations 2 to 5A, 13 to 13B, 16 to 16B, 19 to 19D. The point coordination function provides an access priority to enable a contention-free access procedure. Thereby, the point coordination function controls frame transmission so as to eliminate contention for a specific period.

Figure 3:
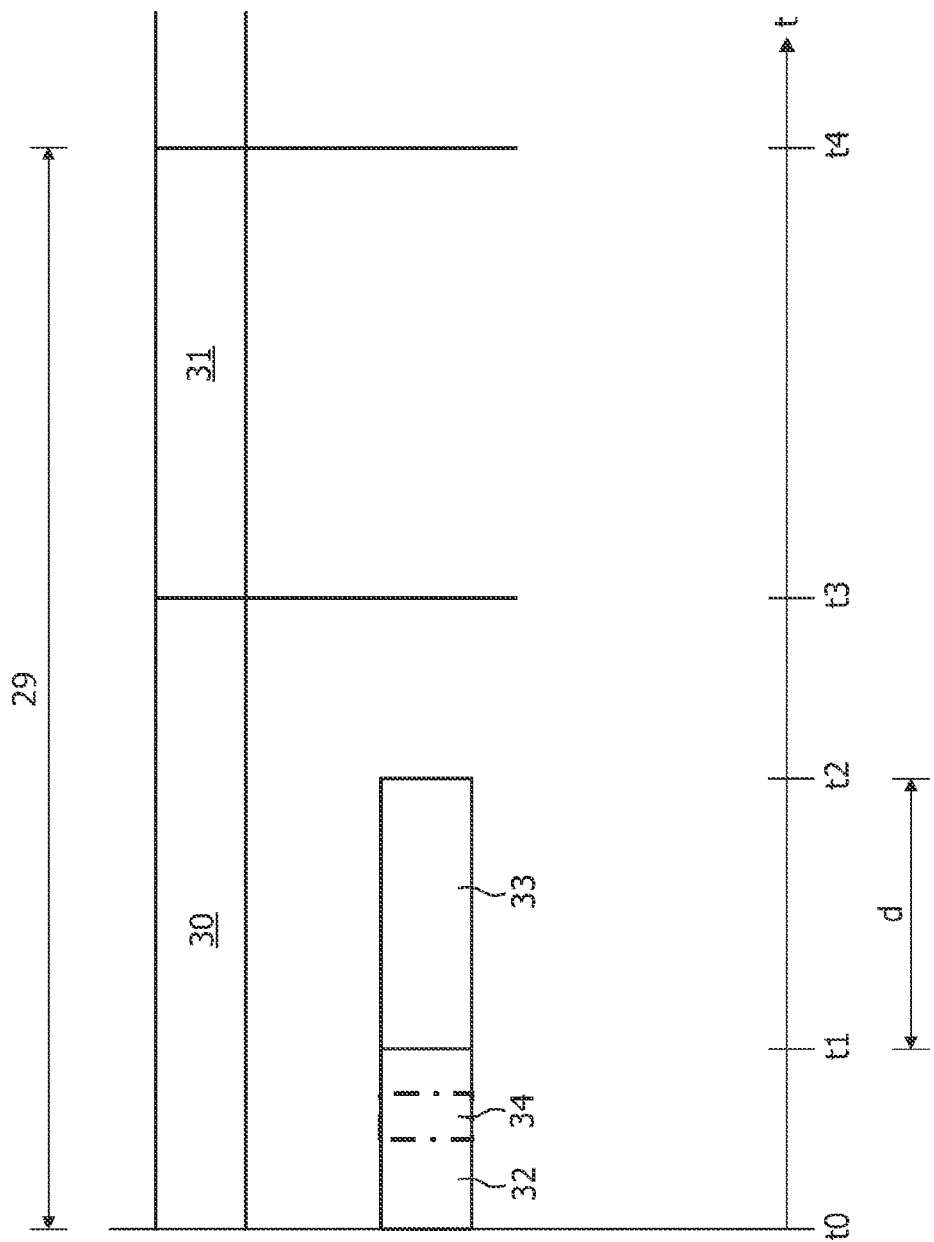
FIG. 3 shows an alternation of contention-free period and contention period according to an embodiment of the present invention.

FIG. 3 illustrates a method for the wireless network 1 according to an embodiment of the present invention. FIG. 3 shows a contention-free period 30 and a contention period 31. Thereby, the interval between timing t0 and timing t4 is defined by a contention-free repetition interval 32. The contention-free period 30 begins with a beacon 32. The beacon 32 is succeeded by a mesh contention-free period 33. The mesh contention-free period 33 starts at timing t1 and ends at timing t2. The contention-free period 30 started with beacon 32 begins at timing t0 and at timing t3. Timing t1 and timing t2 are within the contention-free period 30 so that the mesh contention-free period 33 is a part of the contention-free period 30. It is noted that the end of the mesh contention-free period 33 may also be equal to the end t3 of the contention-free period 30. In this case t2=t3. The duration d between timings t1 and t2, which is the duration d of the mesh contention-free period 33, can be fixed or variable.

The point coordination function provides contention-free frame transfer during the contention-free period 30. Therefore, point coordinators reside in the access points 10, 11, 14, 17, 20. Thereby, it is an option for each of the access points 10, 11, 14, 17, 20 to become the point coordinator. It is noted that all stations 2 to 5A, 13 to 13B, 16 to 16B, 19 to 19D obey the medium access rules of the point coordination function, which are based on the distributed coordination function, and the stations 2 to 2C, 5, 5A, 13A, 13B, 16A, 16B, 19A to 19D, which are not access points, set their network allocation vector at the beginning of the contention-free period 30 starting with beacon 32. The stations 3, 4, 13, 16, 19, which are access points 10, 11, 14, 17, 20, listen to the beacon 32. The beacon 32 comprises a mesh contention-free period announcement flag 34 indicating to the access points 10, 11, 14, 17, 20 whether they can ignore the announced, upcoming contention-free period 30. In case that they can ignore the contention-free period 30, the access points 10, 11, 14, 17, 20 are enabled to communicate during the mesh contention-free period 33. Thereby, the mesh contention-free period announcement flag 34 may be set with reference to individual access points, and, for example, only for access point 10.

It is noted that the implementation of a mesh contention-free period announcement flag 34 in beacon 32 is only an option, and that communication between access points 10, 11, 14, 17, 20 may also be enabled for every mesh contention-free period 33. Further, the mesh contention-free period 33 may also be identical to the contention-free period 30.

The beacon 32 is periodically repeated, wherein the repetition rate is defined by the contention-free repetition interval 29. Hence, the access points 10, 11, 14, 17, 20 know in advance that they may transmit content in repeatingly occurring mesh contention-free periods 33. Thus, they will prefer this periods for uninterrupted frame exchange.

It is noted that during the contention-free period 30 polled transmission is possible. For example, access point 10 of the basic service set 6 may poll transmission from the stations 2 to 2C. But, non-polled transmission by the stations 2 to 2C is prevented during the contention-free period 30 due to the setting of the respective network allocation vectors in stations 2 to 2C. Thereby, due to the fact that the beacon 32 is repeated, stations 2 to 2C may also set their network allocation vector even if they miss the beacon 32.

It is noted that in the embodiments described the access points 10, 11, 14, 17, 20 build up a mesh network, which is the distribution system 8. Hence, in this case, the access points 10, 11, 14, 17, 20 are regarded as mesh devices. Thus, the other stations 2 to 2C, 5, 5A, 13A, 13B, 16A, 16B, 19A to 19D are regarded as non-mesh devices. This architecture has the advantage that the performance of the distribution system 8 is increased.

Depending on the application, other architectures are also possible. For example, within a basic service set 6, 7, 12, 15, 18, also mesh networks may be build up. For example, in the basic service set 6, a part of the stations 2, 2A, 2B, 2C, 3 or all stations 2, 2A, 2B, 2C, 3 may be regarded as mesh devices to build up a mesh network. Then, communication between the stations 2 to 3 of the basic service set 6 is prioritized.

The wireless network 1 and the method for such a wireless network 1 are especially useful, when only a single frequency is available so that legacy stations, which are non-mesh devices, can overload the wireless medium. The legacy devices do not incorporate any means of congestion handling so that their aggressive channel access would lead to insufficient capacity for the wireless network 1. The wireless network 1 enables priorization of mesh devices over non-mesh devices so that a high reliability and an increased performance is achieved.

Although an exemplary embodiment of the invention has been disclosed, it will be apparent to those skilled in the art that various changes and modifications can be made which will achieve some of the advantages of the invention without departing from the spirit and scope of the invention. Such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

The invention claimed is:

1. A wireless network comprising:
   mesh devices; and
   non-mesh devices,
   wherein a medium access control architecture incorporating at least a point coordination function as an access method is provided,
   wherein said point coordination function starts a contention-free period with a beacon so that a non-polled transmission by the non-mesh devices is prevented,
   wherein said mesh devices are enabled to communicate during at least a part of said contention-free period,
   wherein said mesh devices are enabled to communicate with at least other mesh devices during a mesh contention-free period that is part of said contention free period, and
   wherein said beacon comprises a mesh contention-free period announcement flag indicating to said mesh devices whether one or more of said mesh devices can ignore the contention-free period, said mesh devices being enabled to communicate on the basis of an actual setting of said mesh contention-free period announcement flag.

2. The wireless network according to claim 1, wherein said mesh contention-free period follows said beacon.

3. The wireless network according to claim 1, further comprising:
  basic service sets and at least a distribution system,
  wherein each of said basic service sets comprises an access point, which is a mesh device, and stations that are not access points,
  wherein data is moved between each of said basic service sets and said distribution system via said access point belonging to this basic service set, and that said stations that are not access points are operating as non-mesh devices.

4. The wireless network according to claim 3, wherein said access points access at least a wireless channel during said contention-free period.

5. A method for a wireless network comprising a medium access control architecture incorporating at least a point coordination function as an access procedure, the method comprising:
  starting a contention-free period with a beacon so as to prevent a non-polled transmission by non-mesh devices, wherein said beacon comprises a mesh contention-free period announcement flag indicating to said mesh devices whether one or more of said mesh devices can ignore the contention-free period; and
  enabling a communication for mesh devices with at least other mesh devices during a mesh contention-free period that is a part of said contention-free period, said mesh devices being enabled to communicate on the basis of an actual setting of said mesh contention-free period announcement flag.

6. The method according to claim 5, further comprising:
  setting a network allocation vector of said non-mesh devices with said beacon.

7. The method according to claim 5, wherein a duration (d) of a mesh contention-free period is dynamically adapted according to an actual amount of data to be exchanged between said mesh devices.

8. The method according to claim 5, wherein a frame exchange between said mesh devices is arranged essentially in contention-free periods started with repeated beacons.

9. A mesh device for a wireless network comprising:
  a medium access control architecture incorporating at least a point coordination function as an access method, wherein the mesh device is enabled to communicate with at least other mesh devices during a mesh contention-free period that is a part of a contention-free period which is started by said point coordination function with a beacon so that a non-polled transmission by non-mesh devices is prevented and
  wherein said beacon comprises a mesh contention-free period announcement flag indicating to said mesh devices whether one or more of said mesh devices can ignore the announced, upcoming contention-free period, said mesh devices being enabled to communicate on the basis of an actual setting of said mesh contention-free period announcement flag.

10. The mesh device according to claim 9, further comprising:
  a network allocation vector, wherein said network allocation vector is not set for a contention-free period or a mesh contention-free period which is at least a part of said contention-free period.

11. The mesh device according to claim 9, further comprising:
  a network allocation vector, wherein said network allocation vector is not set for a contention-free period or a mesh contention-free period which is at least a part of said contention-free period, when a mesh contention-free announcement flag of said beacon is set.

12. The wireless network according to claim 1, wherein the mesh contention-free period announcement flag is set with reference to one or more specific mesh devices to enable communication between a specific part of the mesh devices during a contention-free period or a mesh contention-free period.

13. The wireless network according to claim 1, wherein the mesh devices are enabled to communicate during the mesh contention-free period if the mesh devices can ignore the contention-free period.

14. The method according to claim 5, wherein said mesh contention-free period immediately follows said beacon.

15. The method according to claim 5, wherein the mesh contention-free period announcement flag is set with reference to one or more specific mesh devices to enable communication between a specific part of the mesh devices during a contention-free period or a mesh contention-free period.

* * * * *